United States Patent
Xue et al.

(10) Patent No.: US 10,877,774 B2
(45) Date of Patent: Dec. 29, 2020

(54) CLOUD INTEGRATION OF APPLICATION RUNTIME

(71) Applicant: SAP SE, Walldorf (DE)

(72) Inventors: Xiaohui Xue, Courbevoie (FR); Samy Mechiri, Suresnes (FR)

(73) Assignee: SAP SE, Walldorf (DE)

(*) Notice: Subject to any disclaimer, the term of this patent is extended or adjusted under 35 U.S.C. 154(b) by 139 days.

(21) Appl. No.: 16/037,404

(22) Filed: Jul. 17, 2018

(65) Prior Publication Data

US 2020/0026527 A1 Jan. 23, 2020

(51) Int. Cl.
*G06F 9/455* (2018.01)
*G06F 9/445* (2018.01)
*H04L 29/08* (2006.01)

(52) U.S. Cl.
CPC ...... *G06F 9/44505* (2013.01); *G06F 9/45533* (2013.01); *H04L 67/10* (2013.01); *H04L 67/141* (2013.01)

(58) Field of Classification Search
CPC ............... G06F 16/128; G06F 16/1873; G06F 2009/45587; G06F 21/53; G06F 8/71; G06F 9/44505; G06F 9/45533; H04L 67/10
See application file for complete search history.

(56) References Cited

U.S. PATENT DOCUMENTS

| | | | | |
|---|---|---|---|---|
| 2007/0180450 A1* | 8/2007 | Croft | ...................... | G06F 9/5077 718/1 |
| 2011/0016467 A1* | 1/2011 | Kane | ................... | G06F 9/45558 718/1 |
| 2013/0298183 A1* | 11/2013 | McGrath | .................. | G06F 9/455 726/1 |
| 2019/0020731 A1* | 1/2019 | Govindankutty | ....... | H04L 67/10 |

* cited by examiner

*Primary Examiner* — Dong U Kim
(74) *Attorney, Agent, or Firm* — Buckley, Maschoff & Talwalkar LLC

(57) ABSTRACT

A system includes reception of a first request from a client application to create an application runtime associated with a tenant of the client application, creation, in response to the first request, of metadata describing configuration information of the application runtime, reception of a second request from the client application to start a session of the application runtime, starting, in response to the second request, of a first application runtime instance in a first container of a first virtual machine based on the configuration information of the application runtime, and return of first connection information to the client application, the first connection information usable by the client application to communicate with the first application runtime instance.

20 Claims, 7 Drawing Sheets

CLOUD INTEGRATION OF APPLICATION RUNTIME

BACKGROUND

Many standalone executable software applications pre-date cloud computing. Accordingly, these applications typically do not provide some capabilities which are desirable for execution in a cloud environment. These capabilities include, but are not limited to, row-level security between users, load-based resource allocation, and multi-tenant isolation. In the latter regard, a tenant is a group of users who share a common access with specific privileges to the software instance.

In one example, R is a popular software environment providing statistical computing and advanced data analysis. R is extensible and allows developers to create custom packages and use various available open-source packages. Since R was designed as a standalone, single-tenant, single-user suite of software facilities, R does not provide cloud-compatible capabilities such as those described above. Systems are desired to provide client applications with functionalities of an application runtime, such as an R system, within a robust cloud platform.

DETAILED DESCRIPTION

The following description is provided to enable any person in the art to make and use the described embodiments. Various modifications, however, will remain readily-apparent to those in the art.

Generally, some embodiments provide a component to enable usage of a given application runtime in the cloud. The component may provide a set of services that allow client applications to provision logical runtimes having particular configurations (e.g., version, installed packages, capacity), and to instantiate directly-accessible and user-isolated instances of the logical runtimes. In some embodiments, the component is a Java cloud service that can be used by a client application to deliver and manage access to R systems.

Figure 1:
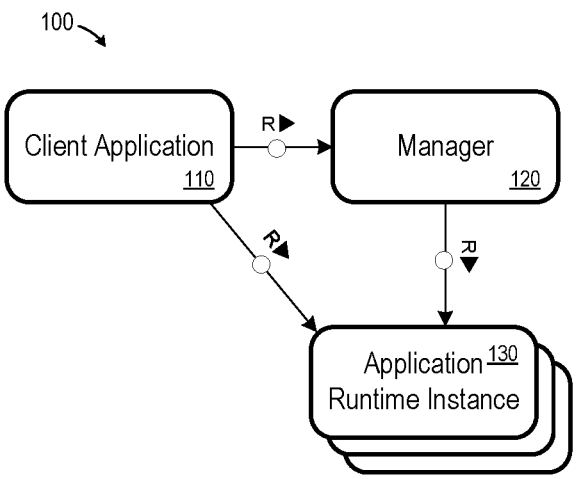
FIG. 1 is a block diagram of a system architecture to provide a client application with access to application runtime instances according to some embodiments.

FIG. 1 is a block diagram of a system architecture to provide client application 110 with access to an application runtime instance according to some embodiments. Client application calls manager 120 to provision and manage an application runtime, and receives an identifier of the runtime in return. Client application 110 then calls manager 120 to start one or more runtime instances of the application runtime identified by the identifier, and receives connection information in return. Client application 110 may then use the connection information to directly connect to an instance 130 and access functionality of the instance 130. For example, in a case that the application runtime instance 130 is an instance of an R application runtime including the Rserve package, client application 110 may transmit R scripts and data to instance 130 via TCP/IP, in response to which instance 130 executes the scripts with respect to the data and returns a result to client application 110.

Figure 2:
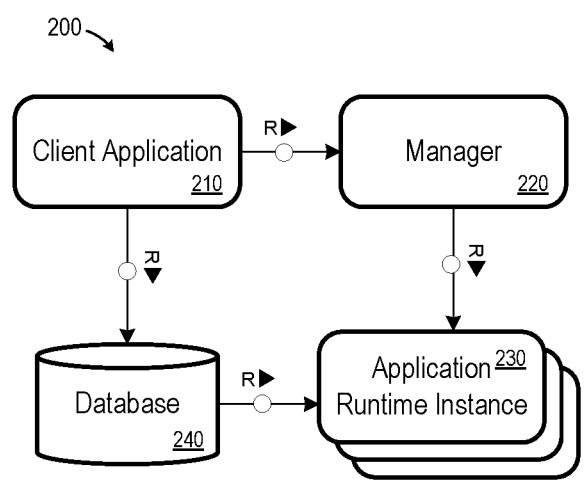
FIG. 2 is a block diagram of a system architecture to provide a client application with access to application runtime instances according to some embodiments.

FIG. 2 is a block diagram of system 200 according to some embodiments. Client application 210 provides requests and connection information to database 240, which behaves as a client to provide scripts and data to application runtime instance 230. Such a configuration may employ network bandwidth more effectively than configurations in which the data is transmitted from database 240 to client application 210 and then from client application 210 to the instance 230.

Figure 3:
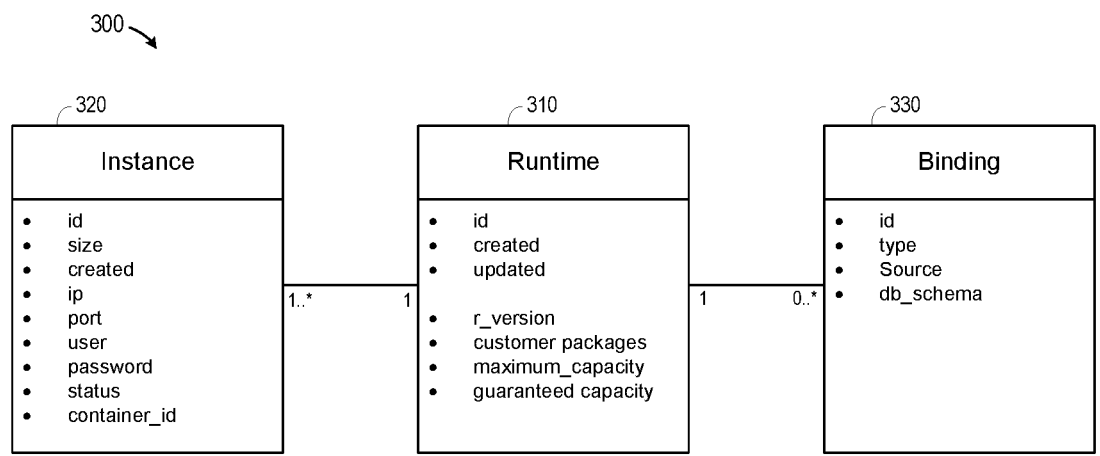
FIG. 3 illustrates a metadata schema according to some embodiments.

FIG. 3 illustrates schema 300 relating the above-described runtimes and instances. Runtime object 310 is a logical representation of an application runtime allocated to a particular tenant. Runtime object 310 provides attributes which allow a client application to configure runtime version, runtime packages and computing resources allocated for the application runtime. Instance object 320 represents physical instances of an application runtime to which a client application may directly connect in order to access the facilities provided by the application runtime (e.g., to delegate R calculations). An instance object 320 is a transient object that may be provisioned for specific needs (e.g., a specific calculation) and destroyed after usage.

Every instance of instance object 320 is attached to an instance of runtime object 310 and inherits the configuration of the runtime object 310. A single instance of runtime object 310 may be attached to more than one instances of instance object 320. For example, client application 110 instructs manager 120 to generate a runtime object instance defining a common configuration that applies to a single tenant of client application 110, and each user of the tenant connects to instance object instances which are attached to the runtime object instance.

Client application 110 specifies an instance of binding object 330 associated with its runtime object instance, and the binding is propagated to associated instance object instances. Binding a runtime to a client application allows the client application to connect to instances of the runtime. A same binding can be used for a Java application (to connect to an instance as shown in FIGS. 1 and 2) or a database (to connect to an instance as shown in FIG. 2).

Figure 4:
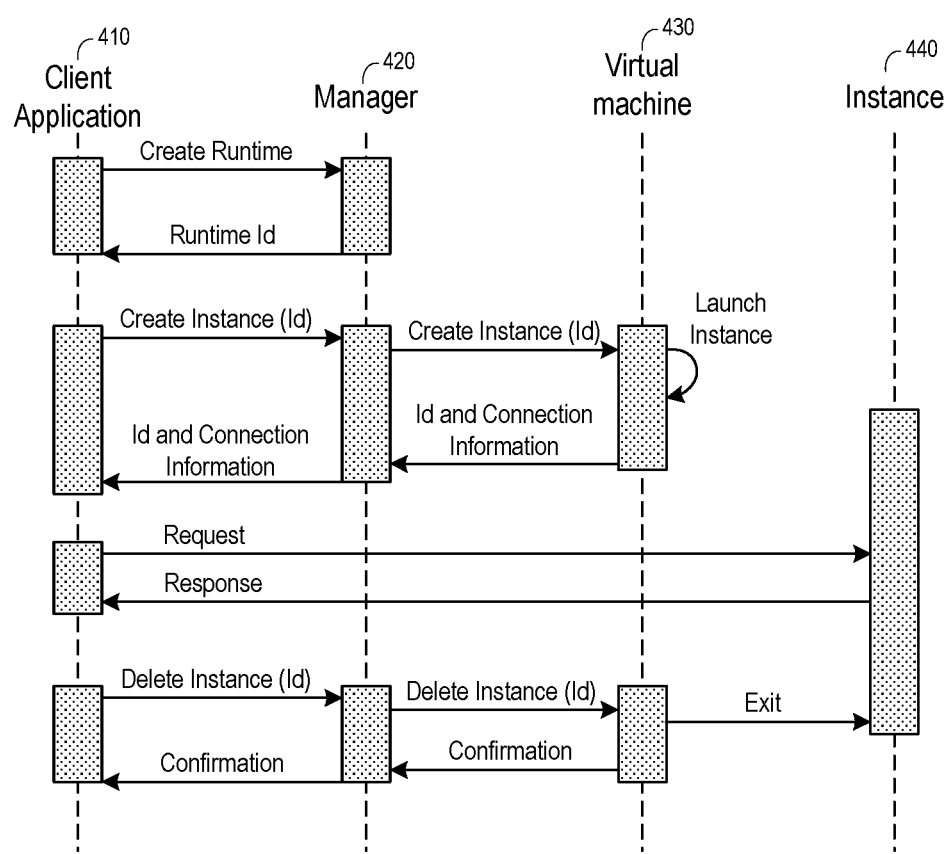
FIG. 4 is a sequence diagram to provide a client application with access to an application runtime instance according to some embodiments.

FIG. 4 is a sequence diagram showing communication between various components according to some embodiments. It will be assumed that a tenant has newly-subscribed to client application 410 and requires functionality of an application runtime (e.g., an R system). In response, client application 410 transmits a request to manager 420 to create a new runtime object instance associated with the tenant.

According to some embodiments, manager 420 provides a dedicated Representational State Transfer (REST) API which client application 410 uses to request the runtime object instance and to specify configuration details of the runtime object instance. Configuration details may include a version of the application runtime, selected packages to be included in the application runtime, and memory and/or processing capacity of a virtual machine executing the application runtime. For example, client application 410 may use the call below to request creation of a runtime object instance and to specify version 3 of R and a binding of the runtime object instance to itself (i.e., "Client_App"). The binding allows client application 410 to connect to any instance object instances that are subsequently created based on the runtime object instance.

```
POST /rmanager/rruntimes
{
    "version":"3",
    "bindings":[{
        "type":"java",
        "name":"Client_App"
    }]
}
```

Manager 420 receives this request, creates a corresponding instance of the runtime object and responds with an identifier of the instance of the runtime object, for example:

```
RESPONSE CODE 201
{
    "id":"13345",
    "url":"/rmanager/rruntimes/13"
}
```

Figure 5:
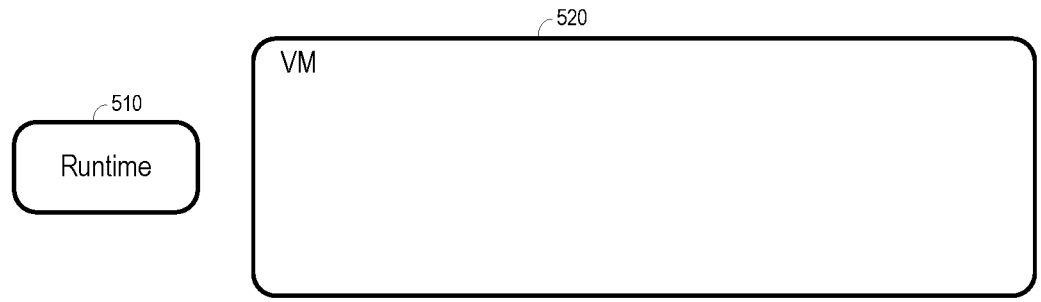
FIG. 5 illustrates a logical runtime and a virtual machine according to some embodiments.

Next, when a user of the tenant starts a session involving facilities of the application runtime (e.g., R), client application 410 transmits a request to manager 420 to create a new instance based on the runtime object instance, for example:
POST/rmanager/rruntimes/13/instances Manager 420 identifies a virtual machine to host the new instance, and instructs the virtual machine to create the new instance. FIG. 5 illustrates previously-created runtime object instance 510 and virtual machine 520. As is known in the art, virtual machine 520 is an abstraction of physical hardware of one or more hardware servers. A single hardware server may run multiple virtual machines, with each virtual machine including a full copy of an operating system, one or more applications, and necessary binaries and libraries. Due to the time required to initialize a virtual machine, some embodiments start an initial number of virtual machines upon initialization of manager 420, with the number depending on an estimated usage.

Virtual machine 430 launches a new instance of the application runtime, which is attached to the runtime object instance and inherits the binding of the runtime object instance. The new instance conforms to the configuration information specified in the associated runtime object instance, and one mechanism for ensuring this conformity will be described below.

Figure 6:
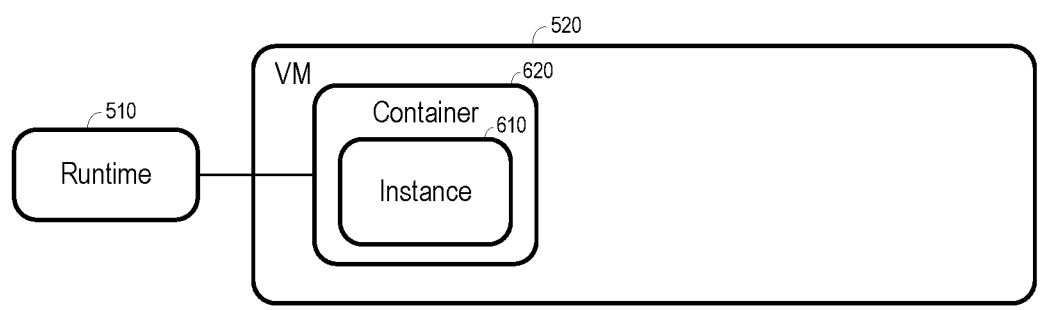
FIG. 6 illustrates a logical runtime and a virtual machine executing a container comprising a runtime instance associated with the logical runtime according to some embodiments.

FIG. 6 illustrates virtual machine 520 after launching of application runtime instance 610 according to some embodiments. As illustrated, application runtime instance 610 is attached to runtime object instance 510 and is hosted by container 620 within virtual machine 510.

Generally, a container is an abstraction at the application layer that packages program code and dependencies together. Multiple containers can run on a virtual machine, with each sharing the guest operating system kernel of the virtual machine with the other containers. According to some embodiments, containers can be started in sub-seconds and therefore provisioned on-demand. Containers guarantee the isolation of application runtime instances from the other application runtime instances running on a same virtual machine, and from the host virtual machine.

The port of the container is mapped to the host port, allowing virtual machine 430 to return the connection information of the launched instance to client application 410 via manager 420, as follows:

```
RESPONSE CODE 200
{
    "id":"4567",
    "created":"2016-12-20 23:02:21.00",
    "ip":"10.178.0.45",
    "port":"2511",
    "user":"rserve",
    "password":"RT3435YDFDFE",
    "status":"ready",
    "connections":0,
    "vm":"vm_id_9876",
    "container":"container_id_54321"
}
```

In the present example, the application runtime instances comprise an R runtime environment including the RServe package. The RServe package supports remote connection, authentication and file transfer, and thereby allows other programs to use the facilities of the R core via TCP/IP.

Client application 410 may connect to the created instance 440 several times during a subsequent session. These connections are represented by a request and response in FIG. 4. As shown, the request and response are transmitted directly between client application 410 and instance 440 using the connection information.

After termination of the session, client application 410 may issue a request to manager 420 to delete instance 440, as follows:
DELETE/rmanager/rruntimes/13/instances/4567

In response, virtual machine 430 closes instance 440 and returns a confirmation. Manager 420 may also monitor attached virtual machines for idle application runtime instances and instruct the virtual machines to delete such instances where appropriate.

Figure 7:
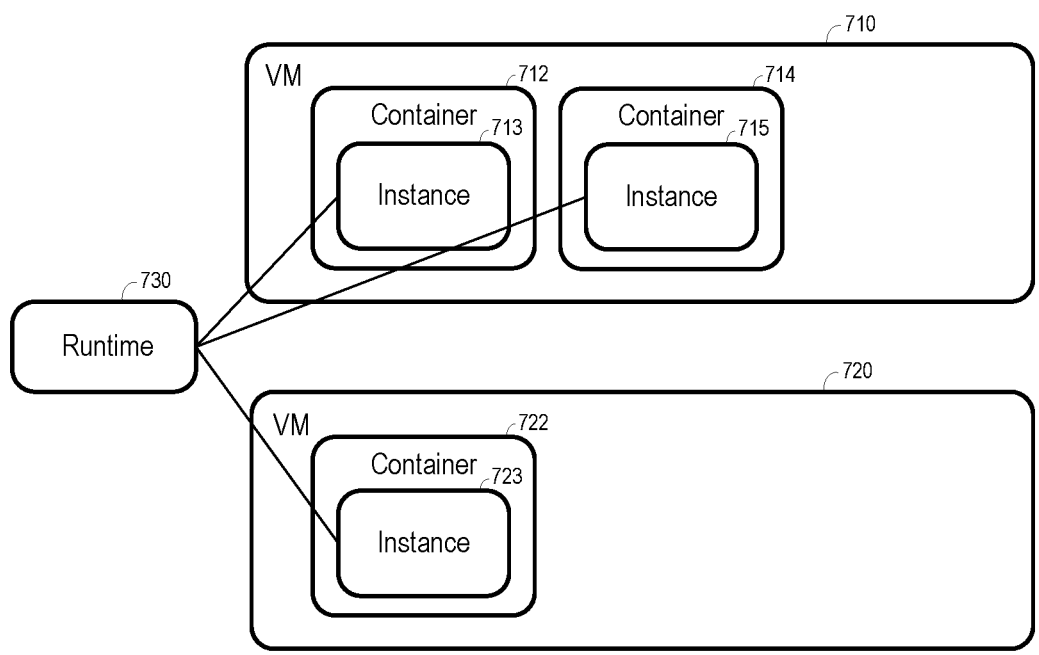
FIG. 7 illustrates a logical runtime and two virtual machines executing containers comprising runtime instances associated with the logical runtime according to some embodiments.

Manager 420 may communicate with more than one virtual machine and more than one application runtime instance per virtual machine. For example, FIG. 7 shows virtual machine 710 and virtual machine 720 according to some embodiments. Virtual machines 710 and 720 may comprise hardware abstractions of a same or different computer servers.

Virtual machine 710 executes containers 712 and 714 comprising, respectively, instances 713 and 715. Instances 713 and 715 each conform to the configuration information of runtime 730 and share a binding to a tenant associated with runtime 730. Virtual machine 720 executes container 722 comprising instance 723. Instance 723 also conforms to the configuration information of runtime 730 and shares the binding to the associated tenant. Each instance may be communicated with during a user session of the tenant as illustrated in FIG. 4. Communication with and execution of instances 713, 715 and 723 occur in isolation with one another.

Embodiments may support multiple simultaneous runtime object instances such as runtime 730. Each of such runtime object instances may be associated with one or more instances such as instances 713, 715 and 723, with each instance executing in a dedicated container. In this regard, a first application runtime instance associated with a first runtime object instance may execute within a container of a first virtual machine, while a second application runtime instance associated with a second runtime object instance may execute within a container of the same first virtual machine, or of a second virtual machine.

Figure 8:
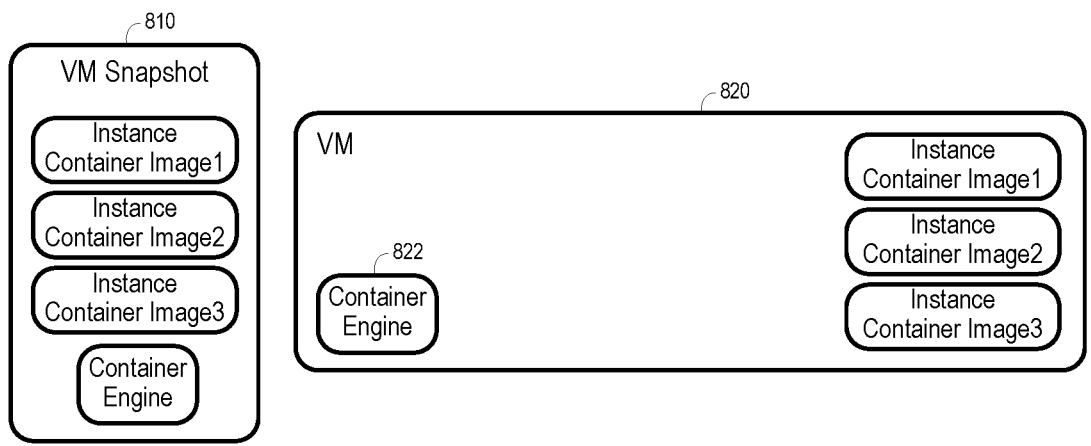
FIG. 8 illustrates a virtual machine snapshot and a virtual machine instantiated based on the virtual machine snapshot according to some embodiments.

As described above, manager 420 may start a number of virtual machines the first time manager 420 starts, with the number of virtual machines depending on an estimated usage. FIG. 8 illustrates start-up of a virtual machine according to some embodiments.

Virtual machine snapshot 810 may be pre-stored to facilitate virtual machine start-up. For example, prior to starting of virtual machine 820 by manager 420, a virtual machine may be started and container engine 820 may be installed thereon. The virtual machine may then be loaded with instance container image1, instance container image2, and instance container image3, and a snapshot of the virtual machine is then created and stored as registered snapshot 810. Virtual machine 820 may then be started quickly on demand based on snapshot 810.

Instance container image1, instance container image2, and instance container image3 each represent different configurations of the desired application runtime. With respect to R, instance container image1, instance container image2, and instance container image3 may represent different versions and/or different package configurations. Accordingly, in response to a new user session of a given tenant, manager 420 instructs virtual machine 820 to execute the one of instance container image1, instance container image2, or instance container image3 which is associated with a configuration specified by the runtime object instance associated with the tenant. Container engine 822 executes the instance container image, causing the associated application runtime instance to run within a dedicated container as described herein.

Figure 9:
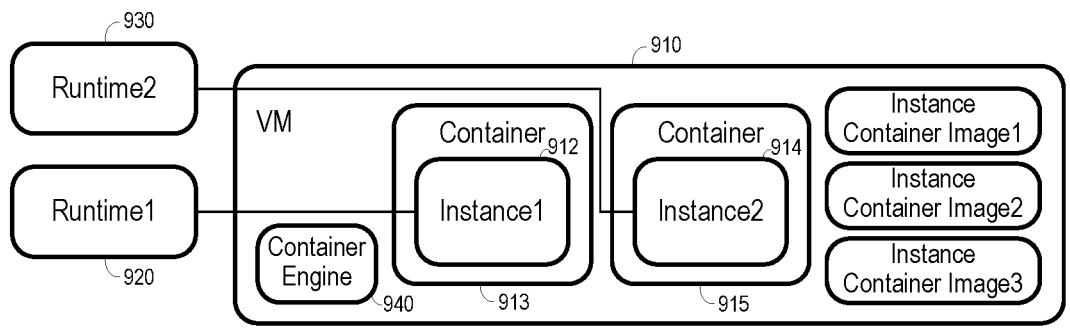
FIG. 9 illustrates a logical runtime and the virtual machine of FIG. 8 executing containers comprising runtime instances associated with the logical runtime according to some embodiments.

As mentioned above, a virtual machine may host containers and application runtime instances associated with different runtime object instances (i.e., tenants). Virtual machine 900 of FIG. 9 hosts instance1 912 associated with runtime1 920 and instance2 914 associated with runtime2 930. For example, container engine 940 may have executed instance container image1 in order to instantiate instance1 912 within container 913, and may have executed instance container image2 in order to instantiate instance2 914 within container 915.

Figure 10:
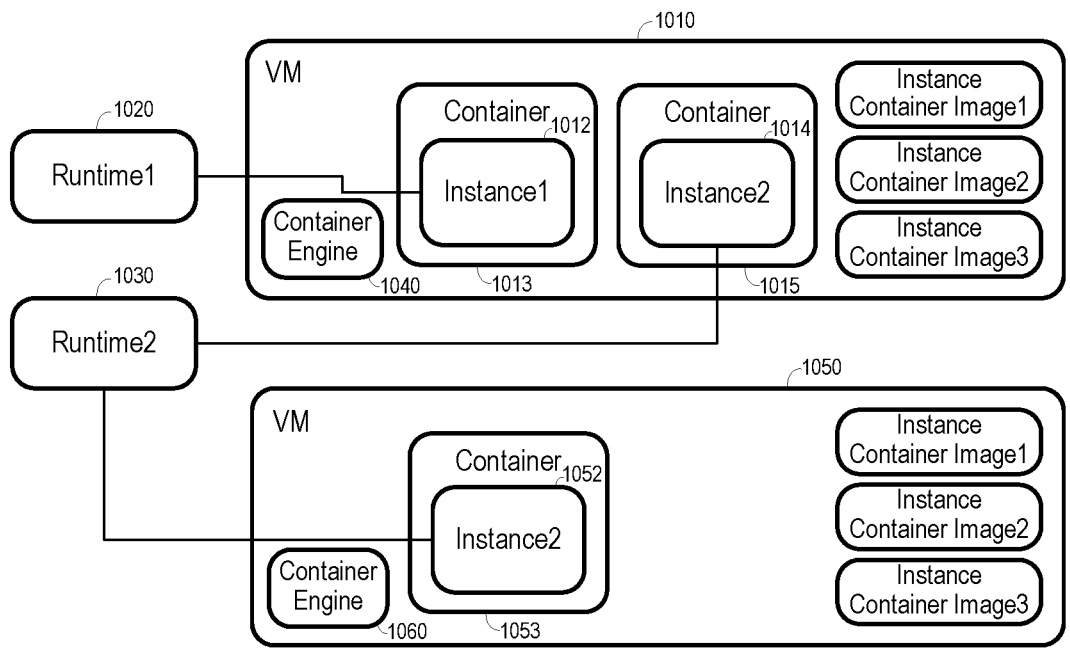
FIG. 10 illustrates a logical runtime and two virtual machines executing containers comprising runtime instances associated with the logical runtime according to some embodiments.

FIG. 10 illustrates a scenario in which virtual machine 1010 hosts instance1 1012 associated with runtime1 1020 and instance2 1014 associated with runtime2 1030. As described with respect to FIG. 9, container engine 1040 has executed instance container image1 in order to instantiate instance1 1012 within container 1013, and has executed instance container image2 in order to instantiate instance2 1014 within container 1015. Additionally, virtual machine 1050 hosts instance2 1052 associated with runtime2 1030. Container engine 1060 has executed instance container image2 in order to instantiate instance1 1052 within container 1053. User sessions of the tenant associated with runtime2 1030 are therefore served by both virtual machine 1010 and virtual machine 1050.

During operation, a manager as described herein may start up additional virtual machines if the existing virtual machines are approaching their container capacity. This may prevent future requests for application runtime instances from failing due to inadequate hardware resources. According to some embodiments, if less than 80% of the capacity of existing started virtual machines is being used, any new application runtime instance is started in an existing virtual machine. In one example, if a new application runtime instance is requested while more than 80% of the capacity is being used, a new virtual machine is started in order to host the new application runtime instance. An error may be returned if no additional virtual machine resources are available.

The manager may also shut down one or more virtual machines if the usage by the client application decreases below a particular level. In one example, if less than 50% of the capacity of existing started virtual machines is being used, the manager may stop one or more started virtual machines.

Figure 11:
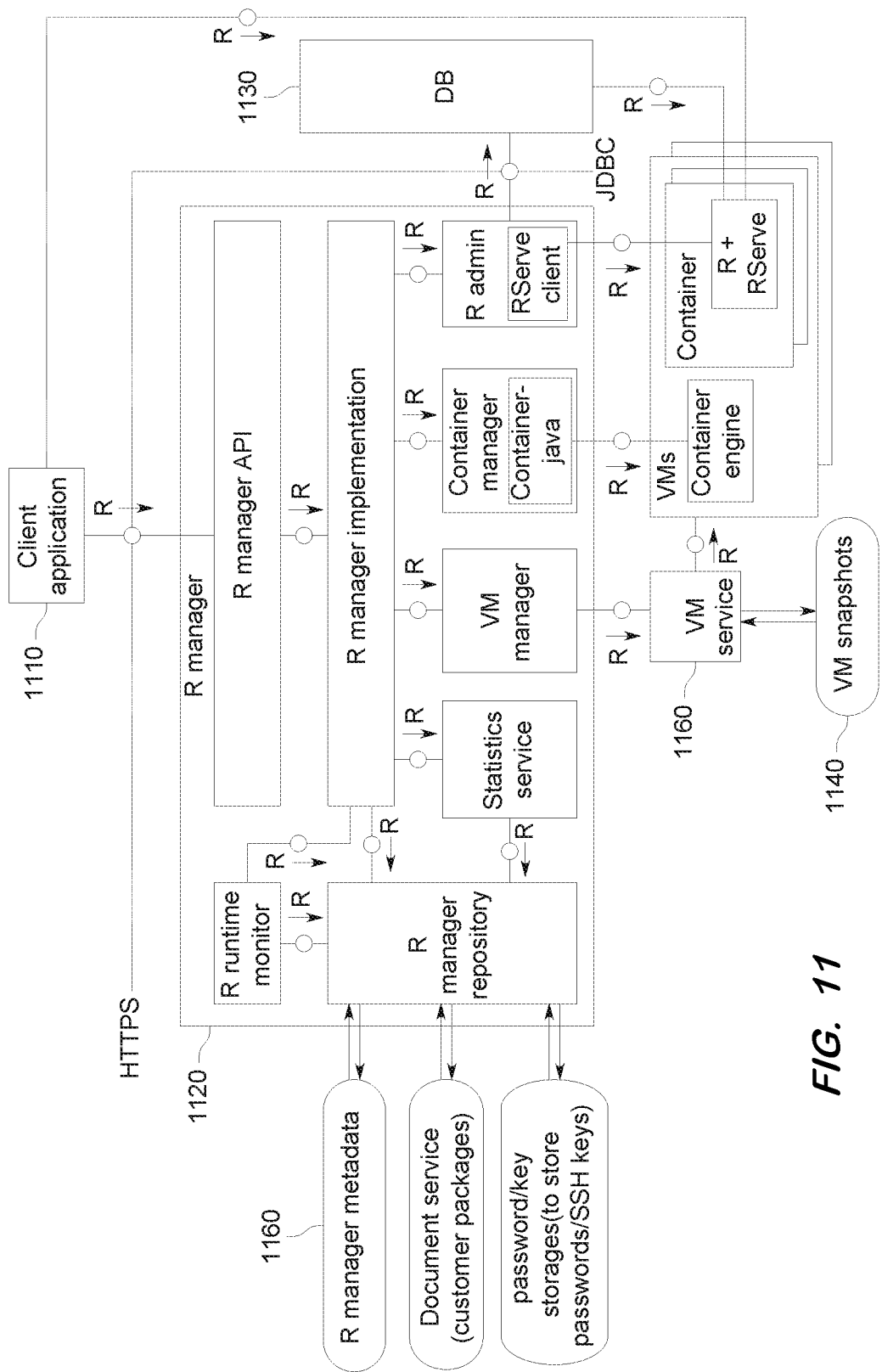
FIG. 11 is a detailed block diagram of a system architecture according to some embodiments.

FIG. 11 is a detailed architecture diagram of a system according to some embodiments. As shown, client application 1110 communicates with R manager 1120 to instantiate an application runtime instance (i.e., R+RServe) in a container of a virtual machine, and then connects directly to such instances. FIG. 11 also illustrates a direct connection between database 1130 and an application runtime instance as described above with respect to FIG. 2.

FIG. 11 shows virtual machine snapshots 1140 used by virtual machine service 1150 to spin up virtual machines as described above. R manager metadata 1160, which may be stored in database 1130, stores data of runtime object instances and bindings to tenants.

Figure 12:
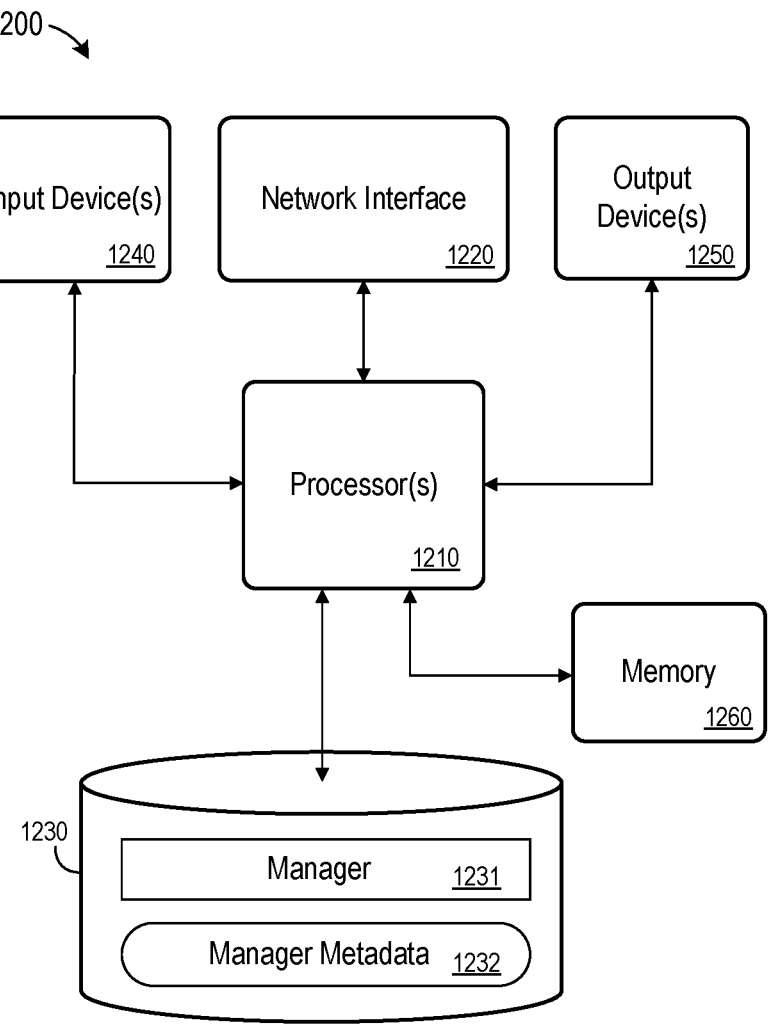
FIG. 12 is a block diagram of a computing apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise a server hosting one or more virtual machines, and running a manager service as described herein on one of the virtual machines. Apparatus 1200 may include other unshown elements according to some embodiments.

Apparatus 1200 includes processor(s) 1210 operatively coupled to network interface 1220, data storage device 1230, one or more input devices 1240, one or more output devices 1250 and memory 1260. Network interface 1220 may and facilitate communication with external devices, such as clients, or a data backends. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Manager 1231 may comprise program code and/or libraries executed by processor(s) 1210 to cause apparatus 1200 to perform any one or more of the processes described herein, and manager metadata 1232 may include data of runtime object instances and tenant bindings. Manager 1231 may be executed on a guest operating system which is in turn executing on a hypervisor layer of apparatus 1200. Embodiments are not limited to execution of these processes by a single apparatus.

Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive a first request from a client application to create an application runtime associated with a tenant of the client application, wherein the first request includes a version information of the application runtime and a request for a binding of a runtime instance to the client application, wherein the binding is propagated to associated runtime instances;
in response to the first request, create metadata describing configuration information of the application runtime;
receive a second request from the client application to start a session of the application runtime;
in response to the second request, start a first application runtime instance in a first container of a first virtual machine based on the configuration information of the application runtime; and
return first connection information to the client application, the first connection information usable by the client application to communicate with the first application runtime instance.

2. A system according to claim 1, the processor to execute the processor-executable process steps to cause the system to:
receive a third request from the client application to start a second session of the application runtime;
in response to the third request, start a second application runtime instance in a second container of the first virtual machine based on the configuration information of the application runtime; and
return second connection information to the client application, the second connection information usable by the client application to communicate with the second application runtime instance,
wherein the first application runtime instance and the second application runtime instance execute contemporaneously.

3. A system according to claim 2, the processor to execute the processor-executable process steps to cause the system to:
receive a fourth request from a client application to create a second application runtime associated with a second tenant of the client application;
in response to the fourth request, create second metadata of a second logical runtime object instance, the second metadata describing configuration information of the second application runtime;
receive a fifth request from the client application to start a session of the second application runtime;
in response to the fifth request, start a third application runtime instance in a third container of the first virtual machine based on the configuration information of the second application runtime; and
return third connection information to the client application, the third connection information usable by the client application to communicate with the third application runtime instance.

4. A system according to claim 3, wherein, prior to reception of the first request, the processor is to execute the processor-executable process steps to cause the system to:
start the first virtual machine based on a virtual machine snapshot, the virtual machine snapshot comprising an image of an application runtime instance based on the configuration information of the application runtime, and an image of an application runtime instance based on the configuration information of the second application runtime.

5. A system according to claim 1, wherein, prior to reception of the first request, the processor is to execute the processor-executable process steps to cause the system to:
start the first virtual machine based on a virtual machine snapshot, the virtual machine snapshot comprising an image of an application runtime instance based on the configuration information of the application runtime.

6. A system according to claim 1, the processor to execute the processor-executable process steps to cause the system to:
receive a third request from the client application to start a second session of the application runtime;
in response to the third request, start a second application runtime instance in a second container of a second virtual machine based on the configuration information of the application runtime; and
return second connection information to the client application, the second connection information usable by the client application to communicate with the second application runtime instance, wherein the first application runtime instance and the second application runtime instance execute contemporaneously.

7. A system according to claim 6, wherein, prior to reception of the first request, the processor is to execute the processor-executable process steps to cause the system to:
start the first virtual machine based on a virtual machine snapshot; and
start the second virtual machine based on the virtual machine snapshot,
wherein the virtual machine snapshot comprises an image of an application runtime instance based on the configuration information of the application runtime.

8. A system according to claim 1, wherein the first request from the client application includes a request for a binding of the runtime instance to the client application.

9. A method comprising:
receiving a first request from a client application to create an application runtime associated with a tenant of the client application, wherein the first request includes a version information of the application runtime and a request for a binding of a runtime instance to the client application, wherein the binding is propagated to associated runtime instances;
in response to the first request, creating a runtime object instance describing configuration information of the application runtime;
receiving a second request from the client application to access a session of the application runtime;
in response to the second request, determining first connection information of a first application runtime instance running in a first container of a first virtual machine, the first application runtime instance conforming to the configuration information of the application runtime; and
returning the first connection information to the client application, the first connection information usable by the client application to communicate with the first application runtime instance.

10. A method according to claim 9, further comprising:
receiving a third request from the client application to access a second session of the application runtime;
in response to the third request, determining second connection information of a second application runtime instance running in a second container of the first virtual machine, the second application runtime instance conforming to the configuration information of the application runtime; and
returning the second connection information to the client application, the second connection information usable by the client application to communicate with the second application runtime instance,
wherein the first application runtime instance and the second application runtime instance execute contemporaneously.

11. A method according to claim 10, further comprising:
receiving a fourth request from the client application to create a second application runtime associated with a second tenant of the client application;
in response to the fourth request, creating a second runtime object instance describing configuration information of the second application runtime;
receiving a fifth request from the client application to access a session of the second application runtime;
in response to the fifth request, determining third connection information of a third application runtime instance running in a third container of the first virtual machine, the third application runtime instance conforming to the configuration information of the second application runtime; and
returning the third connection information to the client application, the third connection information usable by the client application to communicate with the third application runtime instance.

12. A method according to claim 11, further comprising:
starting, prior to receiving the first request, the first virtual machine based on a virtual machine snapshot, the virtual machine snapshot comprising an image of an application runtime instance based on the configuration information of the application runtime, and an image of an application runtime instance based on the configuration information of the second application runtime.

13. A method according to claim 9, further comprising:
starting, prior to receiving the first request, the first virtual machine based on a virtual machine snapshot, the virtual machine snapshot comprising an image of an application runtime instance based on the configuration information of the application runtime.

14. A method according to claim 9, further comprising:
receiving a third request from the client application to access a second session of the application runtime;
in response to the third request, determining second connection information of a second application runtime instance running in a second container of a second virtual machine, the second application runtime instance conforming to the configuration information of the application runtime; and
returning the second connection information to the client application, the second connection information usable by the client application to communicate with the second application runtime instance,
wherein the first application runtime instance and the second application runtime instance execute contemporaneously.

15. A system comprising:
a first virtual machine;
an application runtime manager component to;
create a runtime object instance describing configuration information of an application runtime, wherein the configuration information includes a version information of the application runtime and a request for a binding of a runtime instance to the client application, wherein the binding is propagated to associated runtime instances;
start a first application runtime instance in a first container of the first virtual machine based on the configuration information of the application runtime; and
determine first connection information usable to communicate with the first application runtime instance; and
a client application to:
transmit a request to the application runtime manager component to create the application runtime, the request specifying the configuration information;
receive the first connection information from the application runtime manager component; and
use the first connection information to communicate with the first application runtime instance.

16. A system according to claim 15, the application runtime manager component to:

start a second application runtime instance in a second container of the first virtual machine based on the configuration information of the application runtime; and determine second connection information usable to communicate with the second application runtime instance, wherein the client application is to use the second connection information to communicate with the second application runtime instance, and wherein the first application runtime instance and the second application runtime instance execute contemporaneously.

17. A system according to claim 16, the application runtime manager component to:

create a second runtime object instance describing configuration information of a second application runtime;

start a third application runtime instance in a third container of the first virtual machine based on the configuration information of the second application runtime; and determine third connection information usable to communicate with the third application runtime instance, wherein the client application is to use the third connection information to communicate with the third application runtime instance.

18. A system according to claim 17, wherein the first virtual machine comprises an image of an application runtime instance based on the configuration information of the application runtime, and an image of an application runtime instance based on the configuration information of the second application runtime.

19. A system according to claim 15, wherein the first virtual machine comprises an image of an application runtime instance based on the configuration information of the application runtime.

20. A system according to claim 15, the application runtime manager component to:

create a second runtime object instance describing configuration information of a second application runtime;

start a second application runtime instance in a second container of the first virtual machine based on the configuration information of the second application runtime; and determine second connection information usable to communicate with the second application runtime instance, wherein the client application is to use the second connection information to communicate with the second application runtime instance.

* * * * *